Figure 1:
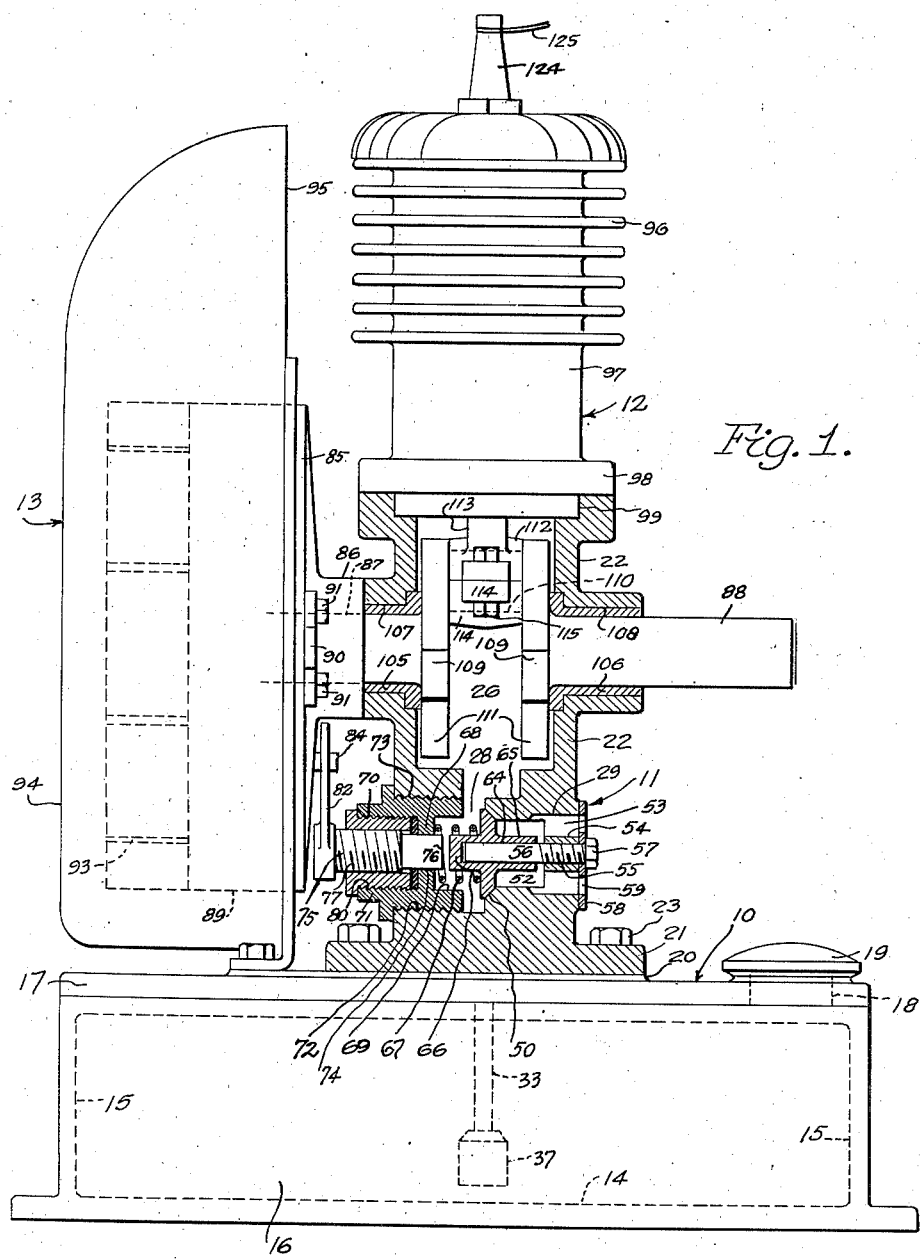

Dec. 7, 1948.      R. J. JOHNSTON ET AL      2,455,775
              INTERNAL-COMBUSTION ENGINE
Filed July 26, 1946                    2 Sheets-Sheet 1

INVENTOR.
Ralph J. Johnston
BY Arthur R. Novotney
Barthel & Bugbee
ATT'YS

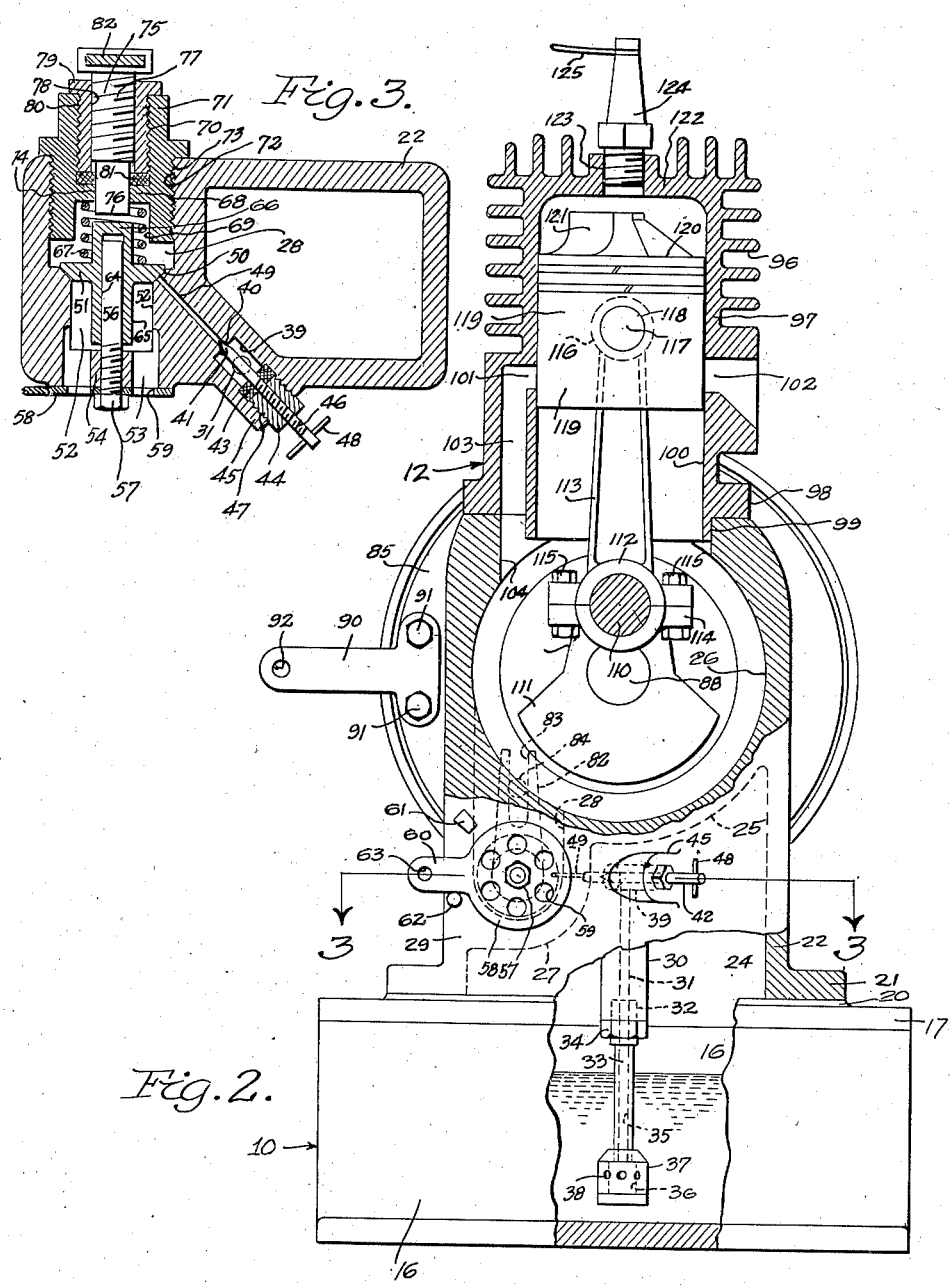

Patented Dec. 7, 1948

2,455,775

UNITED STATES PATENT OFFICE 2,455,775

INTERNAL-COMBUSTION ENGINE

Ralph J. Johnston and Arthur R. Novotney, Pontiac, Mich.

Application July 26, 1946, Serial No. 686,541

20 Claims. (Cl. 123—99)

This invention relates to internal combustion engines and particularly to two-cycle engines.

One object of this invention is to provide a two-cycle engine wherein the speed of the engine is automatically controlled by regulating the spark advance mechanism of the engine.

Another object is to provide a two-cycle engine of the flywheel magneto type wherein the timer plate of the magneto is mechanically connected to the fuel intake so that the fuel feed and therefore the speed of the engine is directly controlled in response to the adjustment of the magneto timer plate.

Another object is to provide a two-cycle engine having its fuel supply admitted to the crankcase chamber through a poppet valve, the extent of opening of which is controlled in response to the adjustment of the spark advance mechanism.

Another object is to provide a two-cycle engine, as set forth in the object immediately preceding, wherein the range of opening of the poppet valve is limited by an adjustable stop operatively connected to the magneto timer control plate of the flywheel magneto with which the engine is equipped so that the adjustment of the timer plate moves the movable stop and therefore limits the throttling of the fuel intake into the crankcases.

Another object is to provide a two-cycle engine, as set forth in the preceding objects, wherein the liquid fuel is injected into the crankcase adjacent the valve seat of the poppet valve controlling the air intake passageway.

Another object is to provide a two-cycle engine, as set forth in the preceding objects, wherein the air inlet passageway is controlled by a simple rotary perforated disc valve and wherein the engine as a whole is similarly characterized by the small number of working parts and simplicity of design.

Other objects and advantages of the invention will become apparent during the course of the following description of the accompanying drawings, wherein:

Figure 1 is a side elevation of a two-cycle internal combustion engine according to a preferred form of the invention, with the crankcase shown in section through a plane passing through the axis of the crankshaft and fuel intake poppet valve;

Figure 2 is a right-hand end elevation of the engine shown in Figure 1 with the upper portion thereof in vertical section through a plane adjacent the connecting rod of the piston and with the fuel tank partly broken away to disclose the vertical fuel pipe leading therefrom to the fuel injector; and Figure 3 is a horizontal section through the crankcase of the engine shown in Figures 1 and 2 taken along the line 3—3 in Figure 2 and illustrating the details of the fuel intake poppet valve, liquid fuel injector and limiting stop controlled by the adjustment of the magneto timer plate.

Referring to the drawings in detail, Figures 1 to 3 inclusive show a preferred form of the two-cycle engine of this invention as generally including a base tank unit 10, a fuel intake control unit 11, a crankcase and cylinder assembly 12 and a flywheel and fan assembly 13. The base tank unit 10 serves to support the remaining units or assemblies, as well as to provide a fuel reservoir.

The base tank unit 10 consists of a hollow casting having a bottom wall 14 and side walls 15 enclosing a fuel chamber 16, the top of which is closed by a plate 17 which also serves as a base plate for supporting the remaining parts of the engine. The base plate 17 is provided with a filling hole 18 closed by a screw cap 19. The chamber 16 is provided with liquid fuel, such as gasoline through the filling hole 18 and, as is conventional in such small two-cycle engines, lubricating oil is previously mixed with the gasoline to provide lubrication for the internal parts of the engine.

Mounted on an upstanding boss 20 on the base plate 17 is the flanged portion 21 of the engine crankcase casting 22, the latter being secured to the base plate 17 by the bolts 23. The lower portion of the crankcase casting 22 is hollow and is provided with a chamber 24 (Figure 2) terminating in a top wall 25 forming a partition between the chamber 24 and the crankcase chamber 26 immediately above it. The lower chamber 24 opens into the upper part of the fuel chamber 16, and in effect, forms a continuation thereof.

The top wall or partition 25 above the chamber 24 is provided with an arcuately curved lower portion 27 into which a fuel intake chamber 28 of roughly U-shaped cross-section extends downwardly from the crankcase chamber 26. Lying between the chamber 28 and the outer rear surface of the crankcase casting 22 is a valve housing portion 29 forming a part of the crankcase casting 22 and bounded on its lower side by the arcuately curved lower portion 27 of the partition 25. This valve housing portion 29 serves to receive a part of the fuel intake control unit 11, as described below.

Extending downwardly from the partition 25 and integral therewith is an elongated boss 30 (Figure 2) having a vertical fuel passageway 31 terminating at its lower end in a counter bore 32 in which the upper end of a fuel conduit 33 is seated and is held in position by the threaded member 34, the lower portion of the latter being in the form of a hexagonal nut. The fuel conduit 33 is provided with a fuel passageway 35 coextensive with the fuel passageway 31 in the boss 30 and opening into a check valve chamber 36 (Figure 2) within a check valve housing 37 secured to the lower end of the fuel conduit 33. Mounted in the check valve chamber 36 is a conventional check valve (not shown) arranged to permit flow of fuel upward through the passageways 35 and 31 and to prevent downward flow thereof. Openings 38 in the check valve housing 37 permit fuel to flow from the fuel chamber 18 into the check valve chamber 36, and thence upward through the fuel passageways 35 and 31.

The fuel passageway 31 at its upper end opens into a fuel injection needle valve chamber 39 (Figure 3) having at its forward end a valve seat 40 for the pointed end 41 of a needle valve 42, the latter being rotatably mounted in an annular packing 43 compressed by a threaded plug 44 threaded into the outer portion 45 of the needle valve chamber 39. The needle valve 42 is threaded as at 46 to engage the correspondingly threaded bore 47 of the plug 44 so that when the needle valve 42 is rotated by means of a cross pin 48, its pointed tip 41 moves toward or away from its needle valve seat 40.

Extending inwardly from the needle valve seat 40 (Figure 3) is a fuel injection passageway 49, the inner end of which opens into the poppet valve seat 50 of a fuel intake poppet valve 51. The valve seat 50 is of annular conical shape and extends between the fuel intake chamber 28 and an air intake chamber 52 to which air passes through a plurality of air intake passageways or bores 53 arranged in a circular path around a central hub 54. The latter likewise serves as a spider and is bored and threaded as at 55 to receive the threaded portion of a stud 56 provided with a hexagonal head 57. Rotatably mounted on the outer end of the stud 56 adjacent the head 57 is a perforated air adjustment disc or choke disc 58 having a plurality of holes 59 alignable with the air passageways 53. The disc 58 is provided with a radially extending handle 60 by which the disc 58 may be rotated through a partial revolution limited by the stops 61 and 62 (Figure 2), so as to fully open or partially close the air intake passageway 53 and thereby control the amount of air reaching the air intake chamber 52. A hole 63 in the outer end of the handle 60 serves for the attachment of a control rod (not shown).

The inner end of the stud 56 is smooth and enters a bore 64 within the shank 65 of the poppet valve 51 so as to provide a guide rod for the reciprocation of the poppet valve 51. The inner end of the shank 65 extends beyond the poppet valve 51 (Figure 3) and has an end wall 66. A coil spring 67 engages the poppet valve 51 and urges the latter into engagement with its valve seat 50. The opposite end of the coil spring 67 is seated against an annular wall 68 (Figure 3) forming a partition between the inner recess 69 and outer recess 70 of a plug 71 having a threaded portion 72 threaded into the correspondingly threaded bore 73 of the crankcase casting 22. The wall 68 is provided with a central bore 74 through which passes the inner portion of a stop pin 75 terminating in an inner end 76 having an outer threaded portion 77 threaded into the correspondingly threaded bore 78 in a gland 79. The latter is threaded as at 80 to engage the correspondingly threaded bore 70 and compress a packing 81 at the inner end of the recess 70.

Mounted on the outer end of the stop pin 75 is a radially extending arm 82 having a radial slot 83 therein engaged by a pin 84 mounted upon the magneto timer plate 85 which in turn is provided with a hub 86 having a bore 87 by which it is loosely and rotatably mounted upon the forward end of the crankshaft 88. The timer plate 85 is connected to and forms a part of a conventional fly-wheel magneto (not shown) mounted within the engine flywheel 89, which in turn is mounted upon the forward end of the crankshaft 88. The rotation of the flywheel 89 (Fig. 1) operates the magneto in a conventional manner to provide high tension electricity for a conventional ignition system (not shown). The rotation of the timer plate 85 advances or retards the spark for igniting the fuel charge in the engine and such rotation is effected by means of a radial handle 90 bolted as at 91 to the timer plate 85 and having a hole 92 in the outer end thereof (Figure 2) for the attachment of a control rod (not shown).

The flywheel 89 also carries fan vanes or blades 93 which operate in a shroud or fan housing 94 to draw air in adjacent the center of the flywheel fan blades 93 and to discharge this air through an outlet portion 95 at the top of the shroud 94 in an axial direction between the cooling fins 96 of the engine cylinder 97. The latter is flanged as at 98 and secured to the upper end of the crankcase casting 22, the lower end of the cylinder being seated in a counterbore 99 therein (Figure 1). The cylinder 97 is provided with a cylinder bore 100 having intake and exhaust ports 101 and 102 respectively located on opposite sides of the cylinder bore 100 (Figure 2). The intake port 101 opens into a vertical intake fuel transfer passageway 103 which leads downwardly in the wall of the cylinder 97 to a corresponding fuel transfer passageway 104 leading into the crankcase chamber 26. The exhaust port 102 opens into a conventional exhaust manifold (not shown), which in turn leads either to a muffler as in a land installation or to an underwater exhaust in a marine installation.

The crankshaft 88 is rotatably mounted in main bearings 105 and 106 respectively mounted in aligned bores 107 and 108 in the crankcase casting 22 (Figure 1) and is provided with crank webs 109 interconnected by a crank pin 110. The lower ends of the crank webs 109 terminate in counterweight or counterbalance portions 111. Mounted upon the crank pin 110 is the lower end 112 of a connecting rod 113, the lower half 114 of the connecting rod bearing thus formed being secured to the upper half 112 by means of bolts 115. The upper end of the connecting rod 113 is provided with a bearing portion 116 engaging a wrist pin 117, the opposite ends of which are seated in bores 118 in a hollow piston 119 reciprocable within the cylinder bore 100. The head 120 of the piston 119 is provided with a baffle 121 which serves to divert the incoming fuel gases from the port 101 away from the outgoing burnt gases escaping through the exhaust port 102. The cylinder head 122 is provided with a threaded bore 123 for the reception of a conventional spark plug 124 connected by the usual cable 125 to the conventional ignition system energized by the flywheel magneto forming a part of the flywheel 89 and controlled as to spark timing by the magneto timer plate 85.

In the operation of the engine of this invention, the crankshaft 88 is rotated by the usual hand crank or equivalent starting mechanism so as to cause the piston 119 to reciprocate within the cylinder bore 100, and at the same time the rotation of the flywheel 89 operates the flywheel magneto to deliver a properly timed spark to the spark plug in the spark plug bore 123. As the piston 119 rises, it creates a suction in the crankcase chambers 26 and 28, whereupon atmospheric pressure entering through the holes 59, passageway 53 and chamber 52 urges the poppet valve 51 inward by overcoming the opposing thrust of the coil spring 67.

The inward motion of the poppet valve 51 uncovers the inner end of the passageway 49 leading from the needle valve chamber 39 to the poppet valve seat 50. The suction within the crankcase chambers 26 and 28 is transmitted to the needle valve passageway 49, past the needle valve point 41 into the needle valve chamber 39, and serves to draw liquid fuel upward through the vertical fuel passageways 31 and 35 and check valve housing 37 from the fuel tank chamber 16. It will be understood, of course, that a suitable air vent is provided in the filler cap 19 to permit air to enter the chamber 16.

The liquid fuel passing upward and inward through the passageways and chambers 35, 31, 39 and 49 is sprayed into the crankcase intake chamber 28 while it mixes with the air entering through the holes 59 and 53 and chamber 52. The mixture of gasoline and air thus produced is drawn upward through the crankcase chamber 26, fuel transfer passageways 104 and 103 and fuel intake passageway 101 into the explosion chamber at the upper end of the cylinder bore 100 when the piston 119 descends and compresses the charge within the crankcase chamber 26. The descent of the piston 119 and the consequent compression of the charge in the crankcase chamber 26, aided by the coil spring 67, closes the poppet valve 51 momentarily.

The subsequent upward motion of the piston 119 compresses the charge within the upper end of the cylinder bore 100 and when the piston nears its upper dead center position, a spark from the spark plug in the spark plug bore 123 ignites the charge and explodes it. The explosion forces the piston 119 downwardly, again compressing a charge which has meanwhile been drawn into the crank case chamber 26, past the poppet valve 51. When the piston 119 arrives at the lower end of its stroke, it opens up the exhaust port 102, the baffle 121 directing the burnt gases outward through the exhaust port 102. Shortly after the piston 119 opens up the exhaust port 102, it also opens the intake port 101, admitting the compressed charge of fuel gas from the crankcase chamber 26 by way of the fuel transfer passageways 104 and 103. The baffle 121 directs the fuel gases upward away from the remainder of the burnt gases which are being discharged through the exhaust port 102 into the exhaust manifold.

To adjust the ratio of the mixture of gas to air, the operator rotates the needle valve 42 by means of the cross pin 48 and also rotates the air adjusting disc or choke 58 until the proper mixture is obtained. In starting the engine, the choke disc 58 is partially closed and reopened after the engine is started.

The engine is started with the magneto timer plate 85 in its retarded position for providing a retarded timing of the spark. After the engine is started, the spark is advanced by swinging the handle 90 downward (Figure 2), rotating the timer plate 85 and pin 84 in a counterclockwise direction. This action swings the arm 82 to the right (Figure 2) by the co-action of the pin 84 in the slot 83, rotating the stop pin 75 in a clockwise direction. This action causes the gap to widen between the inner ends 66 and 76 of the poppet valve 51 and stop pin 75 respectively, permitting the poppet valve 51 to move inward a greater distance from its seat 50, thus admitting a greater charge of gasoline and air to the crankcase intake chamber 28 and crankcase chamber 26. The greater charge of fuel thus admitted causes the engine to accelerate. As the engine gathers speed and warms up, the handle portion 60 of the choke disc 58 may be swung downward to admit a greater proportion of air to the fuel mixture.

As a consequence of the invention, the rotation of the magneto timer plate 85 to advance the spark automatically rotates the stop 77 to enable the fuel intake poppet valve 51 to open wider for a longer period of time, speeding up the engine. The rotation of the magneto timer plate 85 in the reverse or clockwise direction retards the spark and at the same time automatically screws the stop pin 75 inward to narrow the gap between its end 76 and the inner end 66 of the poppet valve 51, narrowing the range of motion and consequently the time of motion of the poppet valve 51. This action decreases the amount of charge entering the intake chamber 28 per revolution of the crankshaft 88 and consequently reduces the speed of the engine. Thus, the control of the timing of the spark by the magneto timer plate 85 automatically controls the quantity of fuel charge entering the crankcase chamber 65 and hence the speed of the engine is controlled automatically along with the spark timing.

While we have shown and described our invention in detail, it is to be understood that the same is to be limited only by the appended claims, for many changes may be made without departing from the spirit and scope of our invention.

What we claim is:

1. An internal combustion engine comprising a housing, a cylinder, a shaft rotatably mounted in said housing, a piston reciprocably mounted in said cylinder, motion-converting mechanism operatively interconnecting said piston and said shaft for converting the reciprocatory motion of said piston to rotary motion of said shaft, an ignition system connected to said cylinder and including an ignition timer with a spark advance adjuster, a fuel intake passageway connected to said housing, a liquid fuel and air mixer connected to said passageway, a valve in said passageway opening into said housing, and movable stop mechanism engageable with said valve to limit the extent to which said valve can open and operatively connecting said valve with said adjuster, said movable stop mechanism being responsive to the spark advance motion of said adjuster for increasing the extent to which said valve can open.

2. An internal combustion engine comprising a housing, a cylinder, a shaft rotatably mounted in said housing, a piston reciprocably mounted in said cylinder, motion-converting mechanism operatively interconnecting said piston and said shaft for converting the reciprocatory motion of said piston to rotary motion of said shaft, an ignition system connected to said cylinder and including an ignition timer with a spark advance adjuster, a fuel intake passageway connected to said housing, a liquid fuel and air mixer connected to said passageway, a valve in said passageway opening into said housing, a valve motion-limiting device engageable with said valve, and mechanism operatively connecting said device with said adjuster for shifting said device in response to the shifting of said adjuster.

3. An internal combustion engine comprising a housing, a cylinder, a shaft rotatably mounted in said housing, a piston reciprocably mounted in said cylinder, motion-converting mechanism operatively interconnecting said piston and said shaft for converting the reciprocatory motion of said piston to rotary motion of said shaft, an ignition system connected to said cylinder and including an ignition timer with a spark advance adjuster, a fuel intake passageway connected to said housing, a liquid fuel and air mixer connected to said passageway, a valve in said passageway opening into said housing, a movable stop engageable with said valve for adjustably limiting the range of opening thereof, and mechanism operatively connecting said stop with said adjuster for shifting said stop in response to the shifting of said adjuster.

4. An internal combustion engine comprising a housing, a cylinder, a shaft rotatably mounted in said housing, a piston reciprocably mounted in said cylinder, motion-converting mechanism operatively interconnecting said piston and said shaft for converting the reciprocatory motion of said piston to rotary motion of said shaft, an ignition system connected to said cylinder and including an ignition timer with a spark advance adjuster, a fuel intake passageway connected to said housing, a liquid fuel and air mixer connected to said passageway, a valve in said passageway opening into said housing, a movable stop engageable with said valve for adjustably limiting the range of opening thereof, and mechanism responsive to the shifting of said adjuster in a spark advancing direction for shifting said stop in a direction increasing said range of valve opening.

5. An internal combustion engine comprising a housing, a cylinder, a shaft rotatably mounted in said housing, a piston reciprocably mounted in said cylinder, motion-converting mechanism operatively interconnecting said piston and said shaft for converting the reciprocatory motion of said piston to rotary motion of said shaft, an ignition system connected to said cylinder and including an ignition timer with a spark advance adjuster, a fuel intake passageway connected to said housing, a liquid fuel and air mixer connected to said passageway, a valve in said passageway opening into said housing, a screw-threaded rotary stop engageable with said valve for adjustably limiting the range of opening thereof, and mechanism responsive to the shifting of said adjuster in a spark advancing direction for rotating said stop in a direction increasing said range of valve opening.

6. An internal combustion engine comprising a housing, a cylinder, a shaft rotatably mounted in said housing, a piston reciprocably mounted in said cylinder, motion-converting mechanism operatively interconnecting said piston and said shaft for converting the reciprocatory motion of said piston to rotary motion of said shaft, an ignition system connected to said cylinder and including an ignition timer with a spark advance adjuster, a fuel intake passageway connected to said housing, a liquid fuel and air mixer connected to said passageway, a yieldingly urged poppet valve in said passageway opening into said housing, and mechanism operatively connecting said valve with said adjuster and responsive to the spark advance motion of said adjuster for increasing the opening range of said valve.

7. An internal combustion engine comprising a housing, a cylinder, a shaft rotatably mounted in said housing, a piston reciprocably mounted in said cylinder, motion-converting mechanism operatively interconnecting said piston and said shaft for converting the reciprocatory motion of said piston to rotary motion of said shaft, an ignition system connected to said cylinder and including an ignition timer with a spark advance adjuster, a fuel intake passageway connected to said housing, a liquid fuel and air mixer connected to said passageway, a valve in said passageway opening into said housing, said mixer including a liquid fuel injector, and movable stop mechanism engageable with said valve to limit the extent to which said valve can open and operatively connecting said valve with said adjuster, said movable stop mechanism being responsive to the spark advance motion of said adjuster for increasing the extent to which said valve can open.

8. An internal combustion engine comprising a housing, a cylinder, a shaft rotatably mounted in said housing, a piston reciprocably mounted in said cylinder, motion-converting mechanism operatively interconnecting said piston and said shaft for converting the reciprocatory motion of said piston to rotary motion of said shaft, an ignition timer with a spark advance adjuster, a fuel intake passageway connected to said housing, a liquid fuel and air mixer connected to said passageway, a valve in said passageway opening into said housing, said mixer including a liquid fuel injector discharging into the valve seat of said valve, and mechanism operatively connecting said valve with said adjuster and responsive to the spark advance motion of said adjuster for increasing the opening range of said valve.

9. An internal combustion engine comprising a housing, a cylinder, a shaft rotatably mounted in said housing, a piston reciprocably mounted in said cylinder, motion-converting mechanism operatively interconnecting said piston and said shaft for converting the reciprocatory motion of said piston to rotary motion of said shaft, an ignition timer with a spark advance adjuster, a fuel intake passageway connected to said housing, a liquid fuel and air mixer connected to said passageway, a valve in said passageway opening into said housing, said mixer including a rotary air controller having a plurality of air inlet ports therethrough, and mechanism operatively connecting said valve with said adjuster and responsive to the spark advance motion of said adjuster for increasing the opening range of said valve.

10. An internal combustion engine comprising a housing, a cylinder, a shaft rotatably mounted in said housing, a piston reciprocably mounted in said cylinder, motion-converting mechanism operatively interconnecting said piston and said shaft for converting the reciprocatory motion of said piston to rotary motion of said shaft, an ignition timer with a spark advance adjuster, a fuel intake passageway connected to said housing, a liquid fuel and air mixer connected to said passageway, a valve in said passageway opening into said housing, said fuel intake passageway including a plurality of air inlet passageways and said mixer including a rotary air controller having a plurality of air inlet ports alignable with and movable relatively to said air inlet passageways to vary the effective inlet areas thereof, and mechanism operatively connecting said valve with said adjuster and responsive to the spark advance motion of said adjuster for increasing the opening range of said valve.

11. An internal combustion engine comprising a housing, a cylinder, a shaft rotatably mounted in said housing, a piston reciprocably mounted in said cylinder, motion-converting mechanism operatively interconnecting said piston and said shaft for converting the reciprocatory motion of said piston to rotary motion of said shaft, an ignition timer with a spark advance adjuster, a fuel intake passageway connected to said housing, a liquid fuel and air mixer connected to said passageway, a valve in said passageway opening into said housing, said fuel intake passageway including a plurality of air inlet passageways and said mixer including a liquid fuel injector and a rotary air controller having a plurality of air inlet ports alignable with and movable relatively to said air inlet passageways to vary the effective inlet areas thereof, and mechanism operatively connecting said valve with said adjuster and responsive to the spark advance motion of said adjuster for increasing the opening range of said valve.

12. An internal combustion engine comprising a housing, a cylinder, a shaft rotatably mounted in said housing, a piston reciprocably mounted in said cylinder, motion-converting mechanism operatively interconnecting said piston and said shaft for converting the reciprocatory motion of said piston to rotary motion of said shaft, an ignition timer with a spark advance adjuster, a fuel intake passageway connected to said housing, a liquid fuel and air mixer connected to said passageway, a valve in said passageway opening into said housing, said fuel intake passageway including a plurality of air inlet passageways and said mixer including a liquid fuel injector discharging into the valve seat of said valve and a rotary air controller having a plurality of air inlet ports alignable with and movable relatively to said air inlet passageways to vary the effective inlet areas thereof, and mechanism operatively connecting said valve with said adjuster and responsive to the spark advance motion of said adjuster for increasing the opening range of said valve.

13. An internal combustion engine comprising a housing, a cylinder, a shaft rotatably mounted in said housing, a piston reciprocably mounted in said cylinder, motion-converting mechanism operatively interconnecting said piston and said shaft for converting the reciprocatory motion of said piston to rotary motion of said shaft, an ignition system connected to said cylinder and including an ignition timer with a spark advance adjuster, a fuel intake passageway connected to said housing, a liquid fuel and air mixer connected to said passageway, a valve in said passageway opening into said housing, said mixer including a liquid fuel injector discharging into the valve seat of said valve, a movable stop engageable with said valve for adjustably limiting the range of opening thereof, and mechanism operatively connecting said stop with said adjuster for shifting said stop in response to the shifting of said adjuster.

14. An internal combustion engine comprising a housing, a cylinder, a shaft rotatably mounted in said housing, a piston reciprocably mounted in said cylinder, motion-converting mechanism operatively interconnecting said piston and said shaft for converting the reciprocatory motion of said piston to rotary motion of said shaft, an ignition system connected to said cylinder and including an ignition timer with a spark advance adjuster, a fuel intake passageway connected to said housing, a liquid fuel and air mixer connected to said passageway, a valve in said passageway opening into said housing, said mixer including a liquid fuel injector discharging into the valve seat of said valve, a movable stop engageable with said valve for adjustably limiting the range of opening thereof, and mechanism responsive to the shifting of said adjuster in a spark advancing direction for shifting said stop in a direction increasing said range of valve opening.

15. An internal combustion engine comprising a housing, a cylinder, a shaft rotatably mounted in said housing, a piston reciprocably mounted in said cylinder, motion-converting mechanism operatively interconnecting said piston and said shaft for converting the reciprocatory motion of said piston to rotary motion of said shaft, an ignition system connected to said cylinder and including an ignition timer with a spark advance adjuster, a fuel intake passageway connected to said housing, a liquid fuel and air mixer connected to said passageway, a valve in said passageway opening into said housing, said mixer including a liquid fuel injector discharging into the valve seat of said valve, a screw-threaded rotary stop engageable with said valve for adjustably limiting the range of opening thereof, and mechanism responsive to the shifting of said adjuster in a spark advancing direction for rotating said stop in a direction increasing said range of valve opening.

16. A speed controller for an internal combustion engine of the type having an explosion chamber connected to a fuel charge intake chamber with an intake passageway and an ignition system connected to said explosion chamber and including an ignition timer with a spark advance adjuster, said speed controller comprising a liquid fuel and air mixer connected to said passageway, a valve in said passageway opening into said intake chamber, and movable stop mechanism engageable with said valve to limit the extent to which said valve can open and operatively connecting said valve with said adjuster, said movable stop mechanism being responsive to spark advance motion of said adjuster for increasing the extent to which said valve can open.

17. A speed controller for an internal combustion engine of the type having an explosion chamber connected to a fuel charge intake chamber with an intake passageway and an ignition system connected to said explosion chamber and including an ignition timer with a spark advance adjuster, said speed controller comprising a liquid fuel and air mixer connected to said passageway, a valve in said passageway opening into said intake chamber, a movable stop engageable with said valve for adjustably limiting the range of opening thereof, and mechanism operatively connecting said stop with said adjuster for shifting said stop in response to the shifting of said adjuster.

18. A speed controller for an internal combustion engine of the type having an explosion chamber connected to a fuel charge intake chamber with an intake passageway and an ignition system connected to said explosion chamber and including an ignition timer with a spark advance adjuster, said speed controller comprising a liquid fuel and air mixer connected to said passageway, a valve in said passageway opening into said intake chamber, a movable stop engageable with said valve for adjustably limiting the range of opening thereof, and mechanism responsive to the shifting of said adjuster in a spark advancing direction for shifting said stop in a direction increasing said range of valve opening.

19. A speed controller for an internal combustion engine of the type having an explosion chamber connected to a fuel charge intake chamber with an intake passageway and an ignition system connected to said explosion chamber and including an ignition timer with a spark advance adjuster, said speed controller comprising a liquid fuel and air mixer connected to said passageway, a valve in said passageway opening into said intake chamber, said mixer including a liquid fuel injector discharging into the valve seat of said valve, a movable stop engageable with said valve for adjustably limiting the range of opening thereof, and mechanism operatively connecting said stop with said adjuster for shifting said stop in response to the shifting of said adjuster.

20. A speed controller for an internal combustion engine of the type having an explosion chamber connected to a fuel charge intake chamber with an intake passageway and an ignition system connected to said explosion chamber and including an ignition timer with a spark advance adjuster, said speed controller comprising a liquid fuel and air mixer connected to said passageway, a valve in said passageway opening into said intake chamber, said mixer including a liquid fuel injector discharging into the valve seat of said valve, a movable stop engageable with said valve for adjustably limiting the range of opening thereof, and mechanism responsive to the shifting of said adjuster in a spark advancing direction for shifting said stop in a direction increasing said range of valve opening.

RALPH J. JOHNSTON.
ARTHUR R. NOVOTNEY.

REFERENCES CITED

The following references are of record in the file of this patent:

UNITED STATES PATENTS

| Number    | Name       | Date           |
|-----------|------------|----------------|
| 2,089,366 | Hansen     | Aug. 10, 1937  |
| 2,146,071 | Irgens     | Feb. 21, 1939  |
| 2,256,948 | Lloyd et al.| Sept. 23, 1941 |